US006245860B1

(12) United States Patent
Materne et al.

(10) Patent No.: US 6,245,860 B1
(45) Date of Patent: Jun. 12, 2001

(54) RUBBER COMPOSITION WHICH CONTAINS IRREGULAR-SHAPED HOLLOW INORGANIC PARTICLES AND ARTICLE HAVING COMPONENT THEREOF

(75) Inventors: Thierry Florent Edmé Materne, Fairlawn, OH (US); Christian Kaes; Giorgio Agostini, both of Colmar-Berg (LU); Uwe Ernst Frank, Marpingen (DE); Friedrich Visel, Bofferdange (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/334,409

(22) Filed: Jun. 16, 1999

(51) Int. Cl.$^7$ .............................. C08F 210/12; C08F 8/34; C08C 19/20; C08C 19/26
(52) U.S. Cl. ..................... 525/331.8; 525/332.6; 525/332.9; 525/333.1; 525/333.2; 525/333.9; 525/343; 525/371; 523/202; 523/215; 523/216
(58) Field of Search .............. 525/331.8, 332.6, 525/332.9, 333.1, 333.2, 333.9, 343, 342, 344, 348; 524/700, 730, 731, 742; 523/202, 326, 216

(56) References Cited

U.S. PATENT DOCUMENTS

Re. 31,992 * 9/1985 Ancker et al. ....................... 523/202

* cited by examiner

Primary Examiner—David W. Wu
Assistant Examiner—R. Harlan
(74) Attorney, Agent, or Firm—Henry C Young, Jr.

(57) ABSTRACT

A rubber composition which contains substantially hollow, irregularly-shaped particles, and/or fragments thereof derived from a surface-modified carbon black aggregate from the which the carbon black core has been removed. For example, an irregularly-shaped carbon black aggregate may be surface-modified to have interconnecting domains of at least one inorganic material on its surface and the carbon black core removed by an oxidation process leaving an irregularly-shaped, substantially hollow particle and/or fragments thereof of said inorganic materials. An article having a component of such rubber composition is also provided such as, for example, a tire or an industrial product.

39 Claims, 2 Drawing Sheets

RUBBER COMPOSITION WHICH CONTAINS IRREGULAR-SHAPED HOLLOW INORGANIC PARTICLES AND ARTICLE HAVING COMPONENT THEREOF

FIELD

This invention relates to a rubber composition which contains substantially hollow, irregular-shaped, inorganic filler particles and/or fragments thereof. An article having a component of such rubber composition may be, for example, a tire or industrial product.

BACKGROUND

Reinforcing fillers are conventionally used in rubber compositions which are, in turn, used as components for various rubber products, including tires and industrial products, including belts and hoses.

Carbon black aggregates are conventionally used for such filler, although precipitated silica aggregates are also sometimes used. Usually a coupling agent is used with the silica to enhance the silica's reinforcing effect for the elastomer. Such reinforcement of rubber compositions is well known to those skilled in such art.

It is to be appreciated that carbon black for rubber reinforcement purposes are typically used in a form of irregularly-shaped aggregates composed of a multiplicity of primary carbon black particles. Usually, the primary carbon black particles themselves are somewhat spherically shaped although they may also be irregularly shaped. Such carbon black aggregates and their use as rubber reinforcement is well known to those having skill in such art.

Hollow silica particles for use in rubber have been disclosed in WO 97/40105 as being prepared by precipitating active silica onto a core material other than silica and then eliminating such core material.

Hollow aerogel microspheres have been disclosed in U.S. Pat. No. 5,227,239 as being prepared by reacting a metal oxide with water and base catalyst in alcohol solvent to result in an alcogel, injecting an inert gas into drops of such alcogel to form hollow alcogel microspheres followed by supercritically drying such alcogel.

Hollow spherical shells prepared by flame combustion is disclosed in U.S. Pat. No. 3,161,468.

Preparation of hollow glass spheres is disclosed in U.S. Pat. No. 4,257,799.

Preparation of hollow porous microspheres from dispersed particle compositions is shown in U.S. Pat. No. 5,397,759.

Preparation of hollow gelled spheres from aqueous sol of ceramic material is shown in U.S. Pat. No. 5,492,870.

It is desired herein to provide for the preparation of a novel filler for rubber compositions, novel rubber compositions and novel products containing at least one component of such rubber composition.

The term "phr" where used herein, and according to conventional practice, refers to "parts of a respective material per 100 parts by weight of rubber, or elastomer".

In the description of this invention, the terms "rubber" and "elastomer", where used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

SUMMARY AND PRACTICE OF THE INVENTION

In accordance with this invention, a rubber composition is provided, as well as an article having at least one component of such rubber composition is provided, wherein said rubber composition is comprised of, based upon 100 parts by weight (phr) of elastomer which is comprised of (A) 100 parts by weight of at least one diene-based elastomer, (B) about 30 to about 110, alternatively about 30 to about 90, phr of reinforcing filler composed of (1) about 20 to about 80, alternatively about 20 to about 50, phr of particles of hollow irregularly-shaped shells of interconnecting domains of inorganic materials and fragments of such hollow shells, (2) and about 10 to about 80, alternatively about 10 to about 60, phr of at least one of (i) rubber reinforcing carbon black (ii) modified rubber reinforcing carbon black, said modified carbon black containing at least one moiety selected from silanol, siloxane, titanium oxide, titanium hydroxide, zirconium oxide, zirconium hydroxide and aluminum hydroxide groups on the surface thereof, (iii) precipitated silica which contains silanol groups on the surface thereof and (iv) aluminosilicate which contains silanol and aluminum hydroxide groups on the surface thereof and (C) a coupling agent having a moiety reactive with said silica, modified carbon black and said shell of inorganic material.

In practice, said inorganic materials for the surface of said carbon black and, therefore, for said hollow shell and fragments thereof, are preferably selected from inorganic materials having reactive hydroxyl groups on their surface selected from at least one of silica, aluminosilicate, titanium oxide, alumina and silicon-magnesium oxide. Preferably, such material is silica which contains silanol groups on the surface thereof or a combination of silica and aluminum which contains both silanol groups and aluminum hydroxide on the surface thereof.

In further accordance with the invention, a method of preparing said component of such article comprises the first preparing said hollow particle reinforcement by forming a modified carbon black having interconnecting domains of at least one of said above-referenced inorganic materials on the surface thereof and removing the resulting carbon black core by oxidation of the carbon black at an elevated temperature followed by blending the resulting hollow particulate material with said elastomers and at least one of said silica, carbon black and modified carbon black.

It is a significant feature of this invention that (1) the substantially hollow particles used in this invention are inherently irregularly shaped by the very nature of the requirement that they are derived from irregularly-shaped carbon black aggregates and, therefore, are not substantially spherical in shape, except as might possibly be found in some individual fragments of such substantially hollow particles, and that (2) the said irregularly-shaped particles are anchored into the elastomer host by use of a coupling agent.

Accordingly, it is considered herein that the practice of this invention is a significant departure from past practice particularly, for example, by providing such irregularly-shaped particles as reinforcement for rubber compositions instead of using substantially spherically-shaped hollow particles—including the anchoring of the irregularly-shaped particles via use of a coupling agent.

In the practice of this invention, it is to be appreciated that the hollow shells may become fragmented (1) during the aforesaid removal of the associated carbon black core or (2) when such shells are mixed under high shear conditions with various rubber mixtures or, alternatively, purposefully pre-crushed prior to mixing with the rubber composition.

Thus, the invention also contemplates the use of mixtures of such shells and fragmented portions thereof.

For an additional understanding of the invention, drawings are provided herewith in which.

Figures 1A, 1B:
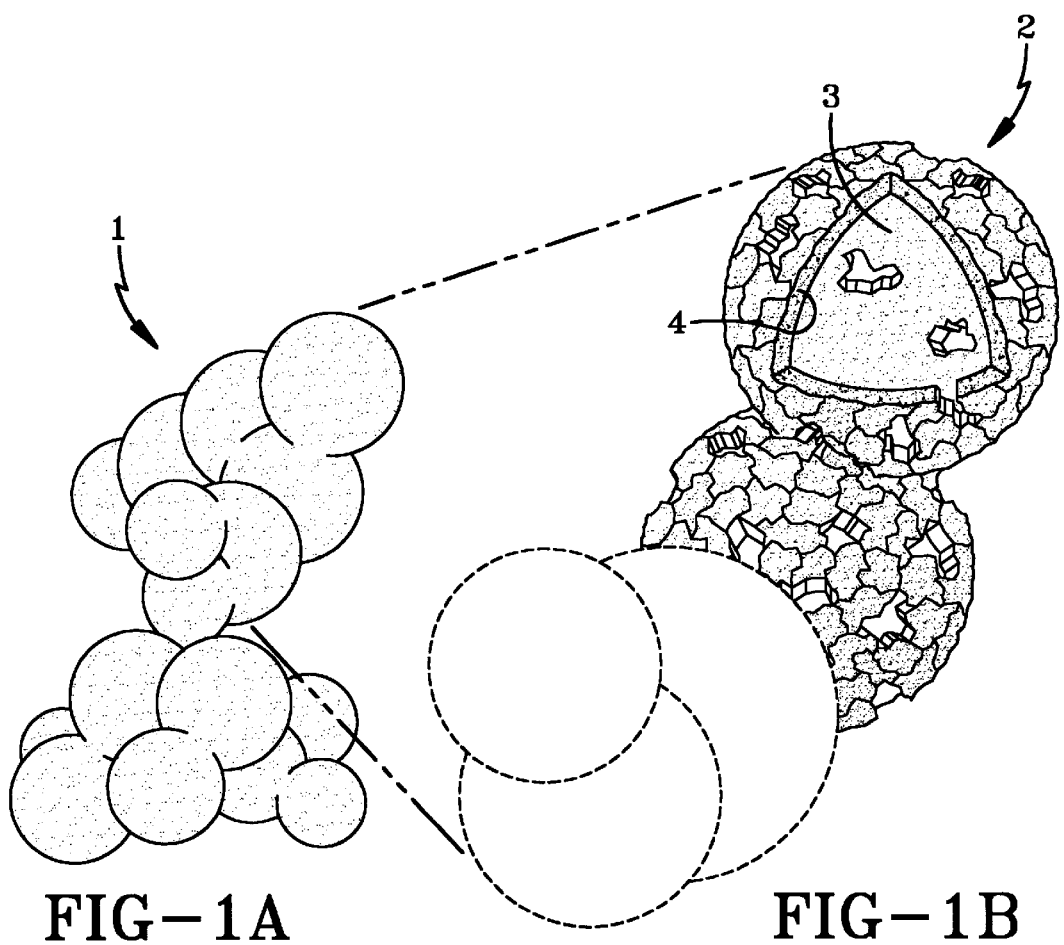
FIG. 1A is a perspective view of irregularly-shaped aggregate of inorganic material (1) created by treating a irregularly-shaped carbon black aggregate according to this invention from which the resulting carbon black core has been removed by oxidation process.
FIG. 1B is an enlarged perspective view of a portion (2) of the irregularly-shaped aggregate (1) with a cut-away portion (3) showing its carbon core having been removed by an oxidation process to leave an irregularly shaped, substantially hollow shell (4) composed of an interconnecting network of a multiplicity of domains of the silica with the silanol groups on its surface.
Figure 2:
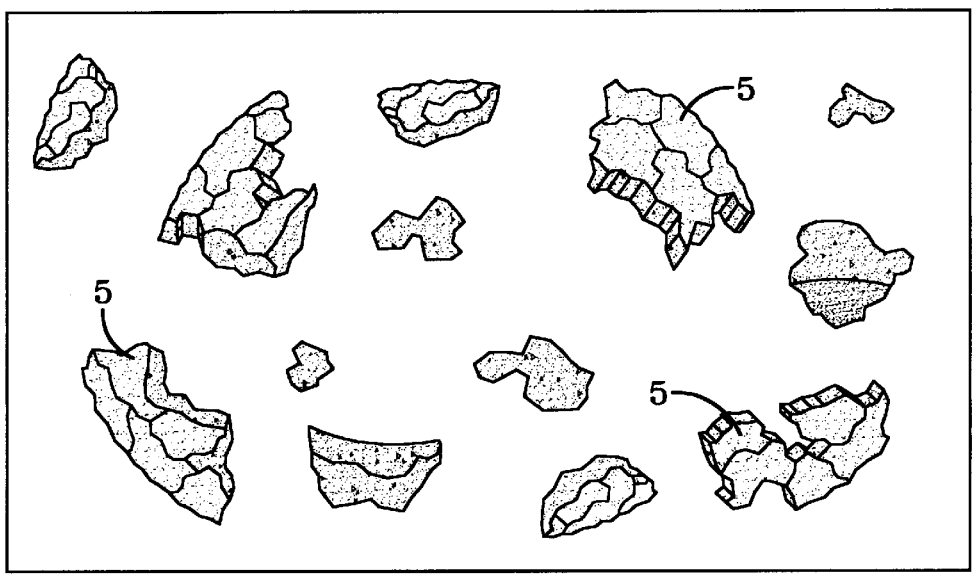
FIG. 2 is a representation of fragmentary portions (5) of the aforesaid shell of FIG. 1B.
Figure 3:
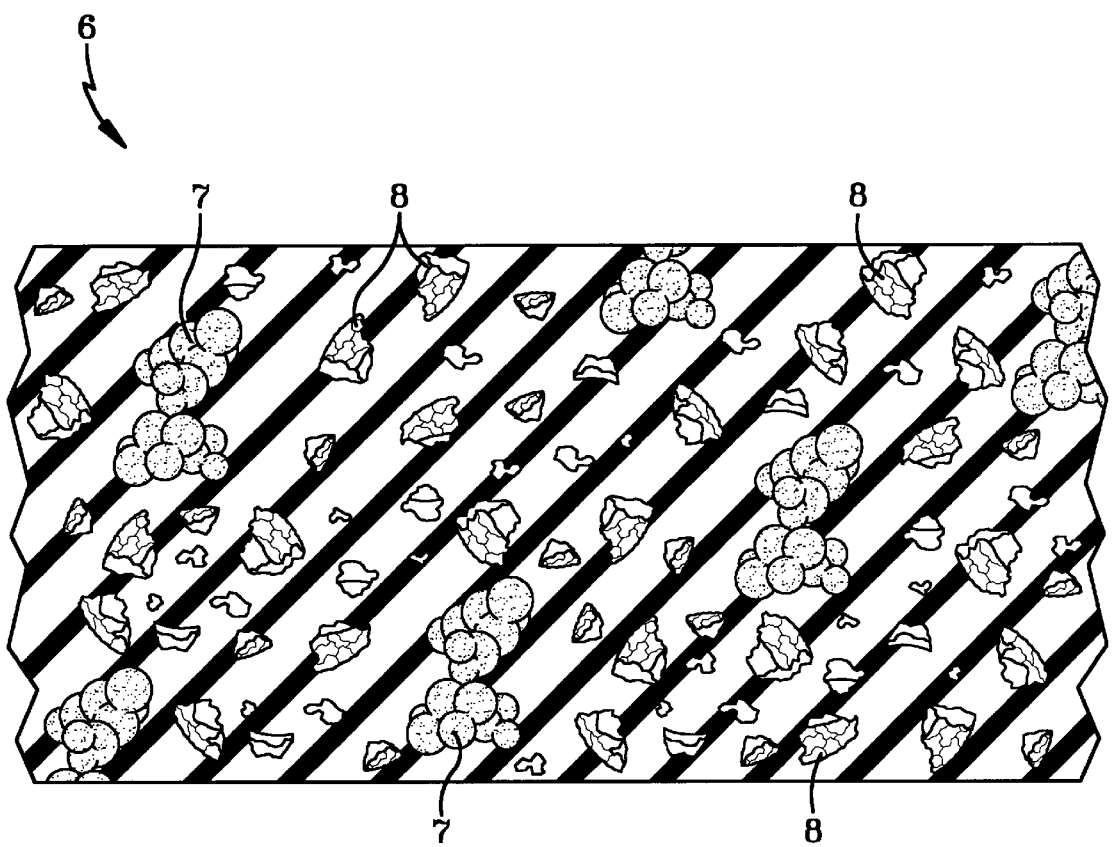

FIG. 3 of a cross-section of a rubber composition (6) which contains a dispersion of both the irregular shaped, substantially hollow shells (6) of interconnecting domains of inorganic material (e.g. silica with silanol groups on its surface) and associated fragments (8) thereof.

It is considered herein that an additional, and usually practical, accompanying advantage in using such shells, and fragments thereof, in the preparation of rubber compositions and rubber products having at least one component of such rubber composition is an apparent lower density of the filler leading to a reduced weight of the rubber composition for a comparable filler volume and, therefore, the rubber product having a component of such rubber composition such as, for example, a tire. A reduction in tire weight, for example, may lead to a reduction in vehicular fuel consumption.

In practice, a modified carbon black aggregate may be prepared, for example, by treating carbon black aggregates to create interconnecting domains of inorganic materials on at a least a portion of the surface thereof. For the hollow particle for use in this invention is desired, such treated carbon black aggregates may be heated to an elevated temperature to oxidize and, thereby, remove the internal carbon black core.

By reference to interconnecting domains of inorganic material it is meant that at least a portion of the carbon black aggregate contains such domains on its surface sufficient to create a substantially hollow particle upon removal of the carbon black core by oxidation. Thus, such interconnecting domains may encompass the entire carbon black aggregate or, alternatively, they may substantially encompass only a portion of the primary carbon black particles which themselves constitute the carbon aggregate.

In practice, it is contemplated that such modified carbon black aggregates for preparation of the substantially hollow particles have from about 20 to about 80, or even up to about 90, percent of their surface contain interconnecting domains of the inorganic materials, with corresponding hydroxyl groups on their surfaces.

It is to be appreciated that if only 20 percent of the carbon aggregate surface contains the domains, then such partial coverage is most likely to include only a portion of the primary particles which constitute the carbon black aggregate. Since this invention requires that at least a portion of the particles are hollow shells, then it is to be appreciated that only a minor portion (less than 50 percent) of the aggregates have only 20 percent of their surface occupied by the said domains.

In practice, it is generally preferred that at least about 50, and more preferably at least about 70 and up to about 80 or even up to about 90, percent of the surface of the carbon black aggregate contains interconnecting domains of such inorganic materials.

In practice, the carbon black core itself may be removed, for example, by oxidizing the carbon black under conditions of elevated temperature and in an atmosphere which contains oxygen such as, for example, conventional atmospheric conditions to convert the carbon black to gaseous components such as carbon monoxide and carbon dioxide.

It is to be appreciated that some of the shells may become fragmented via such oxidation of the carbon black core, particularly where the interconnecting domains of inorganic materials on the surface of the carbon black is fragile, or somewhat incomplete insofar as forming an interconnection of the domains is concerned.

Modified carbon black aggregates may be prepared by various means to provide the aforesaid moieties on their surfaces.

For example, the modified carbon black may be a carbon black aggregate modified by (a) treatment of carbon black with a sodium silicate solution, (b) treatment of carbon black at an elevated temperature with an alkoxysilane or alkylalkoxysilane or (c) by co-fuming carbon black and silane at an elevated temperature.

For the irregularly-shaped hollow shell of inorganic material for use in this invention, a carbon black aggregate may be treated by sodium silicate solution to form the associated silicate structure.

Alternatively for a purpose of form, the irregularly-shaped hollow shell, and in a more preferred practice, a carbon black aggregate may be treated with at least one alkoxy compound having the formula: $R_{4-n}M(OR')_n$, wherein R is a saturated alkyl radical selected from methyl, ethyl, propyl, and butyl radicals; R' is a saturated alkyl radical containing from 1 to 18, preferably from 1 to 4, carbon atoms; and M is selected from silicon, titanium, zirconium and aluminum and wherein n is an integer from 1 to and including 4, or from 1 to and including 3 in the case that M is aluminum.

Preferably, R' is a radical selected from at least one of methyl and ethyl radicals.

In practice, R, if present, may be selected for example, from n-propyl, hexadecyl and octadecyl radicals.

Preferably, n is 4 unless M is aluminum for which n is 3. Accordingly, and in such case, n is 4 where M is selected from at least one of silicon, titanium and zirconium and n is 3 where M is aluminum.

Accordingly, it is preferred that the small radicals are used for the alkoxy portion of the compound and large radicals, if present, are preferred for the organo substituent of the compound.

Representative examples of alkoxy compounds are, for example, tetraalkoxysilicates such as tetraethyoxysilicate, titanium n-propoxide, zirconium t-butoxide and aluminum tri-sec butoxide.

Alternatively, the carbon black aggregate may be modified, for example, by treating a carbon black aggregate with at least one of said alkoxy or organoalkoxy silane, titanium, zirconium or aluminum compounds at an elevated temperature such as, for example, a temperature in a range of about 100° C. to about 800° C., in an inert gaseous atmosphere (e.g. nitrogen atmosphere) for a period of about 10 to about 150 minutes. The degree of modification of the surface of the carbon black aggregate might be controlled, for example, by the ratio of the alkoxy or organoalkoxy compounds to the carbon black aggregate.

The degree of surface modification of a carbon black aggregate might be determined, for example, by analytical methods involving FTIR spectroscopy, 29Si NMR spectroscopy, SIMS mass spectrometry and BET method (nitrogen adsorption) can be used.

For example, the silanol (Si—OH) and siloxane groups on the surface of the carbon black aggregate might be characterized, or determined, by FTIR (Fourier Transform Infrared Spectroscopy) analysis, by 29Si NMR solid state spectroscopy and SIMS (Secondary Ionization Mass Spectroscopy) with the FTIR band for the siloxanes at about 1150 $cm^{-1}$ and the silanols at about 3250 $cm^{-1}$.

As hereinbefore discussed, conventional reinforcing carbon blacks (conventionally carbon black aggregates as is well known to those having skill in such art) which have not been treated with silica, aluminum, magnesium, titanium and zirconium-based inorganic materials may also be used in addition to the aforesaid hollow inorganic materials for reinforcement of the elastomer compositions. Representative of such carbon blacks are, for example, carbon blacks having an Iodine number (value) in a range of about 40 to about 160 g/kg (ASTM D1510), a DBP (dibutylphthalate) number (value) in a range of about 80 to about 180 $cm^3/100$ g (ASTM D2414). Reference may be made to *The Vanderbilt Rubber Handbook* (1990) pages 416–418 for general descriptions of such carbon blacks. Representative of such carbon blacks are those with ASTM designations as, for example, N110, N121, N234, N330, N550, N660 and the like.

For the practice of this invention, various diene-based elastomers may be used representative of various diene-based elastomers are, for example, homopolymers and copolymers of conjugated dienes such as, for example, isoprene and 1,3-butadiene as well as copolymers of conjugated dienes such as, for example, isoprene and 1,3-butadiene, with vinyl aromatic compounds such as styrene and alpha-methylstyrene, preferably styrene.

Also tin-modified, or coupled, versions of such elastomers as well as alkoxysilane-modified versions of such elastomers, as solution polymerization derived elastomers, are contemplated, examples of which are hereafter provided.

The various elastomers may be referred to herein as "diene-based elastomers" whether or not a major portion is derived from diene monomers.

Preferably, the said conjugated diene is selected from at least one of isoprene and 1,3-butadiene.

Accordingly, representative of such elastomers are, for example, cis 1,4-polyisoprene (natural and synthetic), cis 1,4-polybutadiene, isoprene/butadiene, styrene/butadiene (both solution and emulsion polymerization prepared), high vinyl polybutadiene containing from about 35 to about 90 percent vinyl (1,2-) groups, styrene/isoprene/butadiene terpolymers, and trans 1,4-polybutadiene.

In a further aspect of the invention, it is contemplated that alkoxysilane terminated and tin-modified (e.g.: coupled) solution polymerization prepared diene-based elastomers may be used (e.g. copolymers of 1,3-butadiene and isoprene and copolymers of styrene and at least one of 1,3-butadiene and styrene).

The alkoxysilane terminated elastomers may be prepared, for example, by introduction of a chloro-alkoxysilane, or chloro-alkylalkoxysilane, into the polymerization system during the preparation of the elastomer, usually at or near the end of the polymerization reaction. Such termination of such elastomers and the preparation thereof are well known to those having skill in such art.

Tin coupled elastomers may be prepared, for example, by introducing a tin coupling agent during the polymerization reaction, usually at or near the end of the polymerization reaction. Such coupling of elastomers is well known to those having skill in such art.

Representative of such tin coupled diene-based elastomers are, for example, styrene/butadiene and diene-diene copolymers and styrene/isoprene/butadiene terpolymers. In one aspect, it is preferred that a major portion, preferably at least about 50 percent and more generally in a range of about 60 to about 85 percent, of the Sn bonds in the tin coupled are bonded to diene units of the styrene/diene or diene-diene copolymer to create Sn-dienyl bonds such as, for example, butadienyl bonds in the case of butadiene being terminus with the tin.

Creation of tin-dienyl bonds can be accomplished in a number of ways such as, for example, sequential addition of butadiene to the copolymerization system or use of modifiers to alter the styrene and/or butadiene and/or isoprene reactivity ratios for the copolymerization. It is believed that such techniques, whether used with a batch or continuous copolymerization system, is well known to those having skill in such art.

The tin coupling of the elastomer can be accomplished by relatively conventional means and is believed to be well known to those skilled in such art.

Various tin compounds can be used for such purpose and tin tetrachloride is usually preferred.

The tin coupled copolymer elastomer can also be tin coupled with an organo tin compound such as, for example, alkyl tin trichloride, dialkyl tin dichloride and trialkyl tin monochloride, yielding variants of a tin coupled copolymer with the trialkyl tin monochloride yielding simply a tin-terminated copolymer.

Examples of tin-modified, or coupled, styrene/butadiene might be found in, for example, U.S. Pat. No. 5,064,910.

In the further practice of this invention, if desired, a starch/plasticizer composite, preferably having a softening point in a range of about 110° C. to about 160° C. according to ASTM No. D1228, may be added to the rubber composition. Starch conventionally has a softening point in a range of about 180° C. to about 220° C. which is above normally rubber compound mixing temperatures. Accordingly, a starch/plasticizer combination, or as a composite thereof, is used with a plasticizer having a melting point below 180° C. such as, for example, poly(ethylene vinyl acetate), cellulose acetate and diesters of dibasic organic acids, so long as they have a softening point below 180° C. and preferably below 160° C. It is contemplated that such starch composites contain hydroxyl groups on the surface thereof which are available for reaction with coupling agents as described below. Representative examples of use of starch composites in rubber compositions may be found, for example, in U.S. Pat. No. 5,672,639.

In the practice of this invention, a coupling agent is used for said reinforcing fillers as the aforesaid hollow particle reinforcing fillers and fragments thereof, silica—particularly precipitated silica, modified carbon black (e.g. silica-modified carbon black) and aluminosilica as well as the above referenced starch composite to the extent that such materials are individually used in the rubber composition.

Such coupling agents have a moiety, preferably a silane moiety, reactive with hydroxyl groups contained on the surface of such filler(s) and another moiety interactive with at least one of said elastomer(s).

Representative of such coupling agents are, for example, bis-(trialkoxysilylalkyl) polysulfides containing in a range of about 2 to about 8 sulfur atoms in its polysulfidic bridge, with an average of from about 3.5 to about 4.5 sulfur atoms for a polysulfide material or an average of from about 2 to 2.6 sulfur atoms for a disulfide type of material.

Further representative of such material is bis-(3-triethoxysilylpropyl) polysulfide having an average of from 3.5 to 4.5, or an average of from 2 to 2.6, sulfur atoms in its polysulfidic bridge.

Conventionally a weight ratio of coupling agent to the total of said fillers might be in a range of about 0.01/1 to about 0.25/1.

In the practice of this invention, rubber products having at least one component of such rubber composition are contemplated such as, for example, tires, industrial rubber products, shoe soles and sport-related products including, for example, golf balls.

Exemplary of tire components are, for example, tire treads, tire sidewalls, tire sidewall apexes, tire tread base for a tire of tread cap/base construction, wire coatings, fabric ply coatings, tire chafers and tire innerliners.

Preferably such tire components are at least one of a tire tread, tire tread cap and/or tire tread base for a tire with tread of cap/base construction, and tire sidewalls, particularly an outer tire sidewall which is axially outward from the tire supporting carcass.

Exemplary of industrial rubber products are, for example belts, such as for example power transmission belts, conveyor belts, V-belts and hoses.

The rubber composition itself can be provided as being a sulfur-cured composition through vulcanization of the uncured elastomer composition. The sulfur curing is accomplished in a conventional manner, namely, by curing under conditions of elevated temperature and pressure for a suitable period of time.

The curatives for sulfur curing the rubber composition are curatives conventionally used for sulfur-curable elastomers which typically include sulfur and one or more appropriate cure accelerators and, sometimes also a retarder. Such curatives and use thereof for sulfur-curable elastomer compositions are well known to those skilled in the art.

Sequential mixing processes for preparing sulfur-curable rubber compositions in which elastomers and associated ingredients exclusive of curatives are first mixed in one or more sequential steps, usually called a "non-productive mixing step(s)" followed by a final mixing step for adding curatives, usually called a "productive mixing step", are also well known to those skilled in the art.

The commonly employed siliceous pigments used in rubber compounding applications can be used as the silica in this invention, including pyrogenic and precipitated siliceous pigments, including aluminosilicates, although precipitated silicas are usually preferred.

The siliceous pigments preferably employed in this invention are precipitated silicas such as, for example, those obtained by the acidification of a soluble silicate, e.g., sodium silicate, generally exclusive of silica gels.

Such silicas might be characterized, for example, by having a BET surface area, as measured using nitrogen gas, preferably in the range of about 40 to about 600, and more usually in a range of about 50 to about 300 square meters per gram ($m^2/g$). The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300 cc/100 gm.

Various commercially available precipitated silicas may be considered for use in this invention such as, only for example herein, and without limitation, silicas commercially available from PPG Industries under the Hi-Sil trademark with designations 210, 243, etc; silicas available from Rhodia, with, for example, designations of Zeosil 1165MP and silicas available from Degussa AG with, for example, designations VN2 and VN3, etc. and from Huber as Zeopol 8745.

It is readily understood by those having skill in the art that the rubber composition would be compounded by methods generally known in the rubber compounding art such as mixing the various sulfur-vulcanizable constituent rubbers with various commonly-used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur-vulcanizable and sulfur-vulcanized material (rubbers), the additives mentioned above are selected and commonly used in conventional amounts.

Low amounts of reinforcing type carbon blacks(s) for this invention, other than the aforesaid surface treated carbon black, if used, are hereinbefore set forth.

It is to be appreciated that the coupling agent, if in a liquid form, may be used in conjunction with a carbon black carrier, namely, pre-mixed with a carbon black prior to the addition to the rubber composition, and such carbon black is to be included in the aforesaid amount of carbon black accounted for in the rubber composition formulation.

Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), pages 344–346. Typical amounts of antiozonants comprise about 1 to 5 phr.

Typical amounts of fatty acids, if used, which can include stearic acid, palmitic acid, linoleic acid or mixtures of one or more fatty acids, can comprise about 0.5 to about 3 phr.

Often stearic acid is used in a relatively impure state and is commonly referred to in the rubber compounding practice as "stearic acid" and is so referred to in the description and practice of this invention.

Typical amounts of zinc oxide comprise about 2 to about 5 phr. Typical amounts of waxes comprise about 1 to about 5 phr. Often microcrystalline waxes are used. Typical amounts of peptizers, if used, comprise about 0.1 to about 1 phr. Typical peptizers may be, for example, pentachlorothiophenol and dibenzamidodiphenyl disulfide.

The vulcanization is conducted in the presence of a sulfur-vulcanizing agent. Examples of suitable sulfur-vulcanizing agents include elemental sulfur (free sulfur) or sulfur-donating vulcanizing agents, for example, an amine disulfide, polymeric polysulfide or sulfur olefin adducts. Preferably, the sulfur-vulcanizing agent is elemental sulfur. As known to those skilled in the art, sulfur-vulcanizing agents are used in an amount ranging from about 0.5 to about 4 phr, or even in some circumstances, up to about 8 phr, with a range of from about 1 to about 2.5, sometimes from about 1 to about 2, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2, phr. In another embodiment, combinations of a primary and a secondary accelerator might be used with the secondary accelerator being used in amounts of about 0.05 to about 3 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above-referenced additives, unless otherwise provided for herein, are not considered to be an aspect of this invention which is more primarily directed to the use of the prescribed substantially hollow, irregular shaped, shell of inorganic material in combination with a silica coupler in a rubber composition.

The ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage (s). The rubber, hollow particles, silica, carbon black, modified carbon black, and coupling agent, as the case may, are mixed in one or more non-productive mix stages. The terms "non-productive" and "productive" mix stages are well known to those having skill in the rubber mixing art.

In at least one of the non-productive (NP) mixing stages, the materials are thermomechanically mixed and the mixing temperature is allowed to reach a temperature between 140° C. and 190° C.

The rubber composition of this invention can be used for various purposes. For example, it can be used for various tire compounds. Such tires can be built, shaped, molded and cured by various methods which are known and will be readily apparent to those having skill in such art.

EXAMPLE

A rubber composition is prepared which contains a dispersion of a particulate, substantially hollow, irregular-shaped silica particles and fragments thereof.

The hollow, irregular-shaped silica particles are prepared by first creating a modified carbon black aggregate by treating an irregularly-shaped reinforcing carbon black aggregate of primary carbon particles with an alkoxysilane (tetraethyoxysilicate) to form a carbon black aggregate with interconnecting domains of silica on about 70 percent of its outer surface. The carbon black core is then removed by heating to an elevated temperature (e.g.: about 700° C.) under atmospheric conditions to create a substantially hollow, irregular-shaped particle, or shell, of interconnecting silica domains together with fragments thereof.

A rubber composition is prepared which is comprised of elastomers composed of emulsion polymerization prepared styrene/butadiene copolymer and isoprene/butadiene copolymer, and which contains a dispersion of reinforcing filler composed of said substantially hollow, irregular-shaped particles and fragments thereof, precipitated silica and a minor amount of carbon black together with bis-(3-ethoxysilylpropyl) disulfide coupling agent to bind, or anchor, the fillers as an integral part of the rubber composition. The coupling agent contains an average of about 2.2 sulfur atoms in its polysulfidic bridge. The rubber composition also contains conventional amounts of zinc oxide, stearic acid, sulfur and sulfur-cure accelerator.

The resulting rubber composition is sulfur-cured (vulcanized) at an elevated temperature of about 150° C.

Tires of size 195/65R15 are prepared having treads of such rubber composition.

While certain representative embodiments and details have been shown for the purpose of illustrating the invention, it will be apparent to those skilled in this art that various changes and modifications may be made therein without departing from the spirit or scope of the invention.

What is claimed is:

1. A rubber composition comprised of, based upon 100 parts by weight (phr) of elastomer, (A) 100 parts by weight of at least one diene-based elastomer, (B) about 30 to about 110 phr of reinforcing filler composed of (1) about 20 to about 80 phr of particles of hollow, irregularly shaped, shells of interconnecting domains of inorganic materials and fragments of such hollow shells, (2) and about 10 to about 80 phr of at least one of (i) rubber reinforcing carbon black (ii) modified rubber reinforcing carbon black, said modified rubber reinforcing carbon black containing at least one moiety selected from the group consisting of silanol, siloxane, titanium oxide, titanium hydroxide, zirconium oxide, zirconium hydroxide and aluminum hydroxide groups on the surface thereof, (iii) precipitated silica which contains silanol groups on the surface thereof and (iv) aluminosilicate which contains silanol and aluminum hydroxide groups on the surface thereof; wherein inorganic materials for said interconnecting domains are inorganic materials having reactive hydroxyl groups on their surface selected from the group consisting of silica, aluminosilicate, titanium oxide, alumina and silicon-magnesium oxide and (C) a coupling agent having a moiety reactive with said silica, said modified rubber reinforcing carbon black and said shell of inorganic material and another moiety interactive with said diene-based elastomer(s).

2. The rubber composition of claim 1 prepared by a process which comprises first preparing said hollow irregularly shaped, particle reinforcement, and fragments thereof, by forming a carbon black aggregate having interconnecting domains of at least one of said above-referenced inorganic materials on the surface thereof and removing the resulting carbon black core by oxidation of the carbon black at an elevated temperature, followed by blending the resulting hollow particulate material, and fragments thereof, with said elastomer(s) and at least one of the group consisting of said silica, aluminosilicate, carbon black and modified carbon black.

3. The rubber composition of claim 1 wherein the said inorganic material for said interconnecting domains is selected from the group consisting of silica and aluminosilicate.

4. The rubber composition of claim 2 wherein the said inorganic material for said interconnecting domains is selected from the group consisting of silica and aluminosilicate.

5. The rubber composition of claim 1 wherein the said moiety for said modified carbon black is selected from the group consisting of silanol, siloxane and aluminum hydroxide.

6. The rubber composition of claim 2 wherein the said moiety for said modified carbon black is selected from the group consisting of silanol, siloxane and aluminum hydroxide.

7. The rubber composition of claim 3 wherein the said moiety for said modified carbon black is selected from the group consisting of silanol, siloxane and aluminum hydroxide.

8. The rubber composition of claim 4 wherein the said moiety for said modified carbon black is selected from the group consisting of silanol, siloxane and aluminum hydroxide.

9. The rubber composition of claim 1 wherein said modified carbon black is a carbon black aggregate modified by (a) treatment of carbon black with a sodium silicate solution, (b) treatment of carbon black at an elevated temperature with an alkoxysilane or alkylalkoxysilane, or (c) by co-fuming carbon black and silane at an elevated temperature.

10. The rubber composition of claim 2 wherein said modified carbon black is a carbon black aggregate modified by (a) treatment of carbon black with a sodium silicate solution, (b) treatment of carbon black at an elevated temperature with an alkoxysilane or alkylalkoxysilane, or (c) by co-fuming carbon black and silane at an elevated temperature.

11. The rubber composition of claim 1 wherein the said hollow particulate reinforcing material is prepared by oxidizing the carbon black core of irregularly-shaped carbon black aggregate of which from about 20 to about 80 percent of its surface contains interconnecting domains of said inorganic moieties with corresponding hydroxyl groups on such moieties.

12. The rubber composition of claim 1 wherein the said hollow particulate reinforcing material is prepared by oxidizing the carbon black core of irregularly-shaped carbon black aggregate of which at least 50 percent of the surface of the carbon black contains interconnecting domains of said inorganic moieties with corresponding hydroxyl groups on such moieties.

13. The rubber composition of claim 2 wherein the said hollow particulate reinforcing material is prepared by oxidizing the carbon black core of irregularly-shaped carbon black aggregate of which from about 20 to about 80 percent of its surface contains interconnecting domains of said inorganic moieties with corresponding hydroxyl groups on such moieties.

14. The rubber composition of claim 3 wherein the said hollow particulate reinforcing material is prepared by oxidizing the carbon black core of irregularly-shaped carbon black aggregate of which at least 50 percent of the surface of the carbon black contains interconnecting domains of said inorganic moieties, with corresponding hydroxyl groups on such moieties.

15. The rubber composition of claim 4 wherein the said hollow particulate reinforcing material is prepared by oxidizing the carbon black core of irregularly-shaped carbon black aggregate of which at least 50 percent of the surface of the carbon black contains interconnecting domains of said inorganic moieties with corresponding hydroxyl groups on such moieties.

16. The rubber composition of claim 11 wherein said irregularly-shaped carbon black aggregate is a carbon black aggregate having been treated to form said interconnecting domains thereon by treating carbon black aggregate with at least one alkoxy compound having the formula: $R_{4-n}M(OR')_n$, wherein R is a saturated alkyl radical selected from the group consisting of methyl, ethyl, propyl, and butyl radicals; R' is a saturated alkyl radical containing from 1 to 18 carbon atoms; and M is selected from the group consisting of silicon, titanium, zirconium and aluminum.

17. The rubber composition of claim 16 wherein n is 4 where M is selected from the group consisting of silicon, titanium and zirconium and where n is 3 where M is aluminum.

18. The rubber composition of claim 16, wherein R' is a saturated alkyl radical containing from 1 to and including 4 carbon atoms, M is silicon and n is 4.

19. The rubber composition of claim 16 wherein said alkoxy compound is selected from the group consisting of tetraethyoxysilicate, titanium n-propoxide, zirconium t-butoxide and aluminum tri-sec butoxide.

20. The rubber composition of claim 16 wherein said carbon black aggregate is treated at a temperature in a range of about 100° C. to about 800° C. in an inert gaseous atmosphere.

21. The rubber composition of claim 12 wherein said irregularly-shaped carbon black aggregate is a carbon black aggregate having been treated to form said interconnecting domains thereon by treating carbon black aggregate with at least one alkoxy compound having the formula: $R_{4-n}M(OR')_n$, wherein R is a saturated alkyl radical selected from the group consisting of methyl, ethyl, propyl, and butyl radicals; R' is a saturated alkyl radical containing from 1 to 18 carbon atoms; and M is selected from the group consisting of silicon, titanium, zirconium and aluminum.

22. The rubber composition of claim 21 wherein n is 4 where M is selected from the group consisting of silicon, titanium and zirconium and where n is 3 where M is aluminum.

23. The rubber composition of claim 21 wherein R' is a saturated alkyl radical containing from 1 to and including 4 carbon atoms, M is silicon and n is 4.

24. The rubber composition of claim 21 wherein said alkoxy compound is selected from the group consisting of tetraethyoxysilicate, titanium n-propoxide, zirconium t-butoxide and aluminum tri-sec butoxide.

25. The rubber composition of claim 21 wherein said carbon black aggregate is treated at a temperature in a range of about 100° C. to about 800° C. in an inert gaseous atmosphere.

26. The rubber composition of claim 1 wherein said diene-based elastomer is selected from the group consisting of homopolymers and copolymers of conjugated dienes and copolymers of conjugated dienes and vinyl aromatic compounds.

27. The rubber composition of claim 1 wherein said conjugated diene is selected from the group consisting of isoprene and 1,3-butadiene and said vinyl aromatic compound is styrene.

28. The rubber composition of claim 1 wherein said elastomer is selected from the group consisting of cis 1,4-polyisoprene (natural and synthetic), cis 1,4-polybutadiene, isoprene/butadiene, styrene/butadiene (both solution and emulsion polymerization prepared), high vinyl polybutadiene containing from about 35 to about 90 percent vinyl (1,2-) groups, styrene/isoprene/butadiene terpolymers, and trans 1,4-polybutadiene.

29. The rubber composition of claim 27 wherein said elastomers also include at least one of the group consisting of solution polymerization prepared alkoxysilane terminated and tin-coupled elastomers as copolymers of 1,3-butadiene and isoprene and copolymers of styrene and at least one of 1,3-butadiene and styrene.

30. The rubber composition of claim 2 wherein said diene-based elastomer is selected from at least one of the group consisting of homopolymers and copolymers of conjugated dienes and copolymers of conjugated dienes and vinyl aromatic compounds.

31. The rubber composition of claim 2 wherein said conjugated diene is selected from at least one of the group consisting of isoprene and 1,3-butadiene and said vinyl aromatic compound is styrene.

32. The rubber composition of claim 2 wherein said elastomer is selected from at least one of the group consisting of cis 1,4-polyisoprene (natural and synthetic), cis 1,4-polybutadiene, isoprene/butadiene, styrene/butadiene (both solution and emulsion polymerization prepared), high vinyl polybutadiene containing from about 35 to about 90 percent vinyl (1,2-) groups, styrene/isoprene/butadiene terpolymers, and trans 1,4-polybutadiene.

33. The rubber composition of claim 31 wherein said elastomers also include at least one of the group consisting of solution polymerization prepared alkoxysilane terminated and tin-coupled elastomers as copolymers of 1,3-butadiene and isoprene and copolymers of styrene and at least one of 1,3-butadiene and styrene.

34. The rubber composition of claim 1 wherein said composition also contains a starch/plasticizer composite with a softening point in a range of about 110° C. to about 160° C. and having hydroxyl groups on the surface thereof.

35. The rubber composition of claim 2 wherein said composition also contains a starch/plasticizer composite with a softening point in a range of about 110° C. to about 160° C. and having hydroxyl groups on the surface thereof; wherein said plasticizer is selected from at least one of the group consisting of poly(ethylenevinyl alcohol), cellulose acetate and diesters of dibasic organic acids, so long as the plasticizer has a softening point below 160° C.

36. The rubber composition of claim 1 wherein said coupling agent is a bis-(trialkoxysilylalkyl) polysulfide containing in a range of about 2 to about 8 sulfur atoms in its polysulfidic bridge, with an average of from about 3.5 to about 4.5 sulfur atoms.

37. The rubber composition of claim 1 wherein said coupling agent is a bis-(3-triethoxysilylpropyl) polysulfide having an average of from 3.5 to 4.5 sulfur atoms in its polysulfidic bridge.

38. The rubber composition of claim 1 wherein said coupling agent is a bis-(trialkoxysilylalkyl) polysulfide containing in a range of about 2 to about 8 sulfur atoms in its polysulfidic bridge, with an average of from about 2 to 2.6 sulfur atoms.

39. The rubber composition of claim 1 wherein said coupling agent is a bis-(3-triethoxysilylpropyl) polysulfide having an average of from 2 to 2.6, sulfur atoms in its polysulfidic bridge.

* * * * *